United States Patent Office 3,846,268
Patented Nov. 5, 1974

3,846,268
PROCESS FOR PREPARING
1,1,1-TRICHLOROETHANE
Jindrich Zahalka, Emil Plander, and Zdenek Grac,
Prague, Czechoslovakia, assignors to Ustav pro vyzkum,
vyrobu a vyuziti radioisotopu, Prague, Czechoslovakia
No Drawing. Filed Mar. 15, 1971, Ser. No. 124,506
Claims priority, application Czechoslovakia, Mar. 26,
1970, 2,006/70
Int. Cl. B01j *1/10;* C07c *17/06*
U.S. Cl. 204—163 HE                           7 Claims

ABSTRACT OF THE DISCLOSURE

A process for preparing 1,1,1-trichloroethane by contacting a mixture of 1,1-dichloroethane and chlorine with ionizing radiation under conditions of temperature and pressure sufficient to cause chlorination of the 1,1-dichloroethane and to form 1,1,1-trichloroethane.

---

The present invention relates to a process for preparing 1,1,1-trichloroethane.

Among organic solvents chlorine substituted hydrocarbons are well known and an outstanding position is occupied by 1,1,1-trichloroethane (methyl chloroform) due to its characteristics which permit a wide range of end uses. Since it exhibits good dissolving power, chemical inertness and low toxicity, 1,1,1-trichloroethane is suitable as an excellent dry cleaning agent. For this reason new ways for effective mass production thereof have been sought in the past. Thus, it is an object of the present invention to provide a process for preparing 1,1,1-trichloroethane wherein the synthesis of methyl chloroform is achieved by chlorinating 1,1-dichloroethane by ionizing radiation.

Known processes for preparing methyl chloroform are usually based on multistep methods. Consequently, from the technological viewpoint, these methods are inconvenient for industrial production. For example, methyl chloroform can be obtained by chlorinating ethylene or 1,2-dichloroethane to obtain 1,1,2-trichloroethane which has to be dehydrochlorinated to vinylidene chloride and then hydrochlorinated in the presence of catalysts, such as ferric chloride, aluminum trichloride and the like to ultimately form 1,1,1-trichloroethane (see U.S. Pat. No. 3,065,280, Belgian Pat. No. 569,355 and British Pat. No. 916,407).

Processes utilizing both thermal chlorination and hydrochlorination are generally poorly selective and moreover do not result in perfect separation of the products from the reaction mixture, as generally claimed. Among these processes are thermal chlorination of 1,1-dichloroethane and hydrochlorination of vinyl chloride (see e.g. French Pat. No. 1,309,877). However, these processes are accompanied by excessive carbon formation unless the chlorination is carried out in an adiabatic reactor (see e.g. French Pat. No. 1,304,821).

Methyl chloroform also can be obtained as a by-product in the process of chlorinating ethane or its chlorine derivatives under various conditions (see e.g. German Pat. No. 436,999, U.S. Pat. No. 3,304,337, Belgian Pat. No. 636,443 and U.S. Pat. No. 3,012,081).

Methyl chloroform can also be prepared by reacting 1,1-dichloroethylene with hydrogen chloride in the presence of anhydrous ferric chloride, both the reacting constituents being thoroughly predried (see e.g. U.S. Pat. No. 2,209,000 and German Pat. No. 523,436). In addition, there has been described an analogous method in which Friedel-Crafts catalysts have been employed (see e.g. German Pat. No. 1,231,226).

A photochemical method for initiating the chlorination of 1,1-dichloroethane by UV-radiation is also known. This method exhibits a certain advantage over the above mentioned processes, in that it is carried out at lower temperatures and the formation of chlorine derivative mixtures due to pyrolysis is prevented (see e.g. French Pat. Nos. 1,436,453 and 390,398). On the other hand, a disadvantage of this method resides in its limited technical possibilities due to the penetrating power of UV-radiation and the necessity of using reactors constructed of silica glass. Therefore, photo-chlorination of 1,1-dichloroethane has not come into wide use in industrial methyl chloroform production.

In order to overcome the disadvantages of the various processes mentioned above, the present invention provides a novel process for preparing 1,1,1-trichloroethane.

According to the present invention the process of preparing 1,1,1-trichloroethane comprises the steps of irradiating a mixture of 1,1-dichloroethane and chlorine of at a temperature and pressure sufficient to cause chlorination of the 1,1-dichloroethane to form 1,1,1-trichloroethane.

Preferably the process comprises irradiating with ionizing radiation a mixture of 1,1-dichloroethane and chlorines in a molar ratio in a range of from about 1:1.5 to about 1:3.5 at a temperature in a range of from about minus 10° C. to about 80° C. under pressure conditions in a range of from about 0.1 k./sq. cm. to about 15 k./sq. cm., the ionizing radiation having an energy in a range of from about 0.01 Mev. to about 20 Mev. at a dosing speed of from about 0.5 rad./sec. to about 0.1 Mrad./sec. Optimum results are obtained when the reaction is accomplished at temperatures in a range of from about 20° C. to about 60° C., pressures in a range of from about 4 k./sq. cm. to about 10 k./sq. cm. with ionizing radiation having an energy in a range of from about 0.5 Mev. to 12 Mev. and a dosing speed in a range of from about 0.5 rad./sec. to 100 rad./sec. Furthermore, it is to be understood that various combinations of temperatures, pressures, ionizing radiation energies and dosing speeds are operative in carrying out the present invention so long as any particular value for one or more of these conditions falls within or is slightly above the top or below the bottom of the various ranges set forth. The process of this invention may also be carried out by providing a mixture of the constituents within the preferred ratios set forth and irradiating the mixture at ambient pressure and temperature, that is, room temperature (circa 20° C.-25° C.) and atmospheric pressure.

The merit of the novel process of this invention for preparing 1,1,1-trichloroethane is that quick and highly effective chlorination of 1,1-dichloroethane into 1,1,1-trichloroethane is achieved by utilization of high power ionizing radiation for the initiation of the chain reaction without thermal dissociation or splitting of the 1,1-dichloroethane with consequent generation of elemental carbon. To be more precise, the term "chain reaction," as employed herein means a reaction which generally proceeds by initiation, propagation and termination. This type of reaction proceeds by ionizing radiation acting on the mixture of 1,1-dichloroethane and chlorine and providing a sufficient portion of atomic chlorine to result in a high yield chlorination of the 1,1-dichloroethane. Within the temperature range set forth, no splitting of the 1,1-dichloroethane occurs and the chlorine has a very selective course since the hydrogen on the carbon atom of the 1,1-dichloroethane with chlorine already present thereon is relatively labile and becomes more so due to the ionizing radiation and is easily displaced by the atomic chlorine. Thus, danger of splitting of the 1,1-dichloroethane is minimized and relatively high yields of 1,1,1-trichloroethane can be obtained.

The reaction speed is positively influenced by elevation of chlorine pressure in the system since the reaction is a second order reaction wherein the speed is proportional to the chlorine concentration. By increasing the chlorine pressure, the solubility of the chlorine in 1,1-dichloroethane is enhanced due to the increase of the diffusion speed of the chlorine into the liquid phase. The chlorination proceeds at sufficiently high speed within temperature range of from about minus 10° C. to about 80° C. The chlorination should preferably be carried out at room temperature or a lower one, since at reduced temperatures the solubility of chlorine in 1,1-dichloroethane is higher and consequently a higher chlorine concentration in the system enables the reaction to proceed more quickly.

An efficient initiation of 1,1-dichloroethane chlorination may be obtained, as mentioned hereinabove, by applying a radiation within an energy range of from about 0.01 to about 20 Mev. and preferably of about 0.5 to about 12 Mev. Suitable sources of radiation include but are not limited to gamma rays, beta rays, X-rays and accelerated electrons. The effect according to the invention can be obtained even by means of corpuscular radiation, such as, for instance, alpha rays, but due to their short range, it is not convenient from the technical viewpoint. The relevant factor for the choice of ionizing radiation resides in its penetrating power which should be sufficient to provide irradiation of the entire reactor volume. From this standpoint, a most suitable radiation source is gamma radiation emitted by man-made radioisotopes, particularly cobalt 60 and cesium 137. These sources of ionizing radiation are convenient also from economic point of view.

The speed of the 1,1-dichloroethane chlorination initiated by ionizing radiation is further influenced by dosing speed of the radiation in the reactor, which speed ranges from 0.5 rad./s. to 0.1 Mrad./sec. as mentioned above. Generally, it is recommended that when using gamma radiation sources, an average dosing speed in the reacting constituents within a range of from about 0.5 rad./sec. to about 100 rad./sec. be employed. When using such dosing speeds, the chlorination proceeds at such a rate that the reaction mixture is not irradiated by such high integral doses as to cause readily determinable radioactivity in the chlorinated substrate or the chlorination products.

The process of this invention can be carried out in any suitable apparatus so long as it provides sufficient protection against radiation. A suitable apparatus is an irradiating chamber encased in lead on concrete and containing a source of radiation. It is further convenient to provide a space in the chamber for receiving a reaction vessel containing the reaction constituents. It is generally desirable that the chamber and the vessel containing the reactants be constructed in that the vessel fits into the chamber surrounding the radiation source. In addition, the reaction vessel is usually equipped with inlet and outlet lines for introducing chlorine into the reacting mixture and for the exit of waste gas from the vessel. The reaction vessel and the inlet and outlet lines therefore, are usually made of glass, although they may also be made of a suitable metal such as nickel.

Generally, the process of this invention may be carried out simply by introducing the required molar amounts of reactants into a reaction vessel equipped with a waste gas line. The reaction vessel is sealed and placed in an irradiating chamber where it is exposed to a radiation source at a suitable pressure, temperature, energy level and dose rate as indicated above. The reaction is then allowed to proceed to completion. On the other hand, the reaction can be carried out by introducing the 1,1-dichloroethane to the reaction vessel, placing the reaction vessel into an irradiating chamber and supplying chlorine to the reaction vessel in the form of fine bubbles while maintaining the reaction mixture under suitable pressures and temperatures, as mentioned above and allowing the reaction to proceed to completion. As the reaction proceeds waste gas, predominantly hydrogen chloride, is delivered from the reaction vessel. Reaction termination and desired chlorination grade is indicated by the increase of chlorine concentration in the waste gas. Generally, when the concentration of chlorine in the waste gas begins to approach 1.0 percent by volume, the reaction is completed. Moreover, the volume of unreacted chlorine in the waste gas should not be permitted to exceed 1.0 percent. It should also be noted in carrying out the process of this invention the chlorine gas can be bubbled into the 1,1-dichloroethane in incremental amounts, that is, discontinuously.

Regardless of what particular process steps set forth above are employed, under the conditions herein set forth, the portions of high chlorinated ethane derivatives does not exceed 10 percent and generally is less than 5 percent.

The following examples are given to illustrate the invention more specifically. In the examples, all parts and percents are by weight, unless otherwise indicated.

EXAMPLE I

Into a 250 ml. glass reaction vessel provided with an inlet pipe and a waste gas outlet pipe; the inlet leading to the bottom of the vessel and terminates in a bed of sintered glass; there is introduced 126 ml. (148.4 grams) or 1.5 moles of 1,1-dichloroethane. The vessel is placed in an irradiating chamber containing cobalt 60 as an ionizing radiation source and having an activity of 7000 Ci, (1.3 Mev.). Two moles of chlorine (2 moles) is then fed to the reaction vessel through the inlet pipe terminating in the bed of sintered glass and is dispersed in the form of fine bubbles into the 1,1-dichloroethane over a 60 minute interval and at a rate such that the volume of chlorine in the waste gas exiting from the second pipe approaches but does not exceed 1.0 percent by volume. The temperature of the reactants is maintained at about 60° C. and the pressure in the reaction vessel is maintained at about atmospheric pressure during chlorine addition. At the completion of chlorine addition, the reaction vessel is drained and the crude product removed. The product has the following composition: 95 percent by weight of the total product of 1,1,1-trichloroethane and 5 percent by weight of the total product of 1,1-dichloroethane and higher chlorine derivatives of ethane. The high yield of 1,1,1-trichloroethane was suitable as a dry cleaning agent as well as for any of its other known uses.

EXAMPLE II

Into a 127 ml. nickel autoclave provided with closable input and outlet pipes and with a manometer and which has been located in an irradiation chamber having a cobalt 60 source of ionizing radiation having an activity of 7000 Ci, (1.3 Mev.) chlorine is flowed by way of the input pipe to purge air from the autoclave. Next, 42 ml. (49.8 grams) or 0.5 moles of 1,1-dichloroethane together with 0.5 moles of chlorine is supplied to the autoclave while the temperature therein is maintained at 30° C. and the pressure at 4 k./sq. cm. After about 2 hours an integral dosage of 1.2 Mrads. is reached and the pressure is slowly decreased by flow of waste gas through the outlet pipe. The autoclave is drained and provides 61 grams of crude product, which is 91.3 percent by weight, relative to the starting 1,1-dichloroethane. Upon distillation the composition of the product is as follows: 92 percent by weight of 1,1,1-trichloroethane, 5 percent by weight of 1,1-dichloroethane and 3 percent by weight of higher chlorine derivatives of ethane. The 1,1,1-trichloroethane is also usable as a dry cleaning agent.

The examples have been repeated using radiation rays of the gamma, beta, X-rays amongst other, and at temperature ranges at and between minus 10° C. and about 80° C. under pressure conditions within the range of 0.1 k./sq. cm. to about 15 k./sq. cm. Energy ranges of from about 0.01 Mev. to about 20 Mev. at dosing ranges of about 0.5 rad./sec. to about 0.1 Mrad./sec. were also tried in repeated experiments. The results were all satisfactory and high yields of 1,1,1-trichloroethane were produced.

The process of this invention presents many advantages. For example, it provides high yields of 1,1,1-trichloroethane by a relatively simple method which may be carried out on simple equipment that is easily constructed, even when not readily available commercially. In addition, the process is a simple and direct manner of chlorination with readily available reactants. Numerous other advantages of the invention will be apparent to those skilled in the art.

It is to be understood that many variations of this invention may be made without departing from the spirit and scope thereof. Accordingly, the invention is not to be limited by the embodiments described herein except as defined in the appended claims.

What is claimed is:

1. A process for preparing 1,1,1-trichloroethane comprising irradiating with high energy ionizing radiation and initiating a chain reaction in a mixture consisting essentially of 1,1-dichloroethane and chlorine with absence of a solvent therefor, at a molar ratio of from about 1:1.5 to about 1:3.5 at a temperature in a range of from about minus 10° C. to about 80° C., under pressure in a range of 0.1 kg./sq. in. to about 15 kg./sq. in. to cause chlorination and without thermal dissociation of said 1,1-dichloroethane and consequent formation of elemental carbon, the ionizing radiation having an energy in a range of from about 0.5 Mev. to about 20 Mev. at a dosing speed in a range of from about 0.5 rad./sec. to about 0.1 Mrad./sec. until chlorination is substantially complete and recovering approximately 90% 1,1,1-trichloroethane.

2. The process as defined in claim 1 wherein the chlorine is introduced into 1,1-dichloroethane by bubbling.

3. The process as defined in claim 1, wherein the temperature is in a range of from about 20° C. to about 60° C.

4. The process as defined in claim 1, wherein the pressure conditions are in a range of from about 4 k./sq. cm. to about 10 k./sq. cm.

5. The process as defined in claim 1, wherein the ionizing radiation has an energy in a range of from about 0.5 Mev. to about 12 Mev.

6. The process as defined in claim 1, wherein the dosing speed is in a range of from about 0.5 rad./sec. to about 100 rad./sec.

7. The process as defined in claim 1, wherein the pressure is atmospheric pressure and the temperature is about 20° C.

References Cited

UNITED STATES PATENTS

| | | | |
|---|---|---|---|
| 3,537,968 | 11/1970 | Chamberlin et al. | 204—162 H |
| 3,019,175 | 1/1962 | Haefner et al. | 204—163 R |
| 3,474,018 | 10/1969 | Goeb et al. | 204—163 R |
| 3,386,905 | 6/1968 | Kohl et al. | 204—163 H.E. |
| 3,505,193 | 4/1970 | Mottern et al. | 204—163 R |
| 3,629,085 | 12/1971 | Coppens | 204—163 R |

FOREIGN PATENTS

| | | | |
|---|---|---|---|
| 1,102,417 | 2/1968 | Great Britain | 204—163 R |
| 1,055,410 | 1/1967 | Great Britain | 204—163 H.E. |
| 1,390,398 | 1/1964 | France | 204—163 R |

CARL D. QUARFORTH, Primary Examiner

R. GAITHER, Assistant Examiner

U.S. Cl. X.R.

204—162 HE, 163 R